July 23, 1935.   J. P. TARBOX   2,009,349
RAILWAY VEHICLE TIRE
Filed June 25, 1932
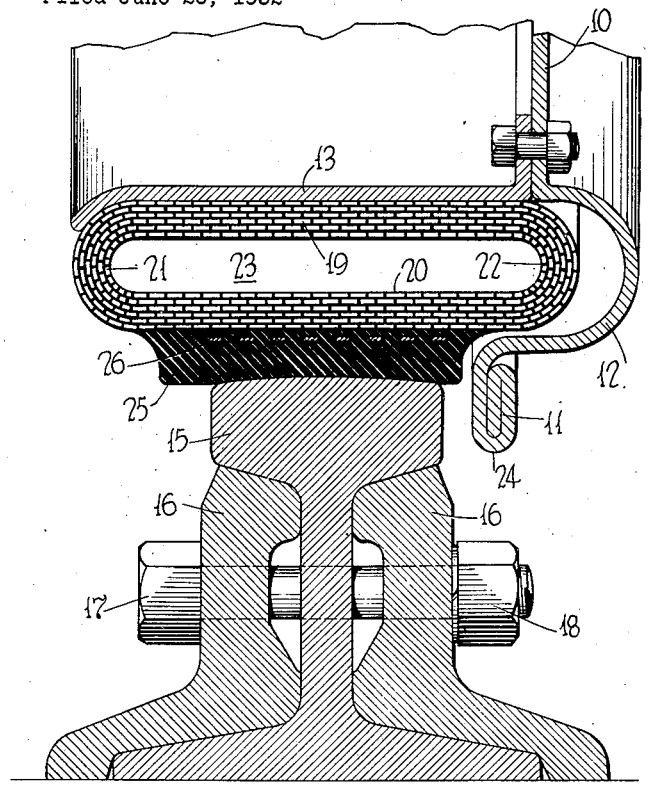
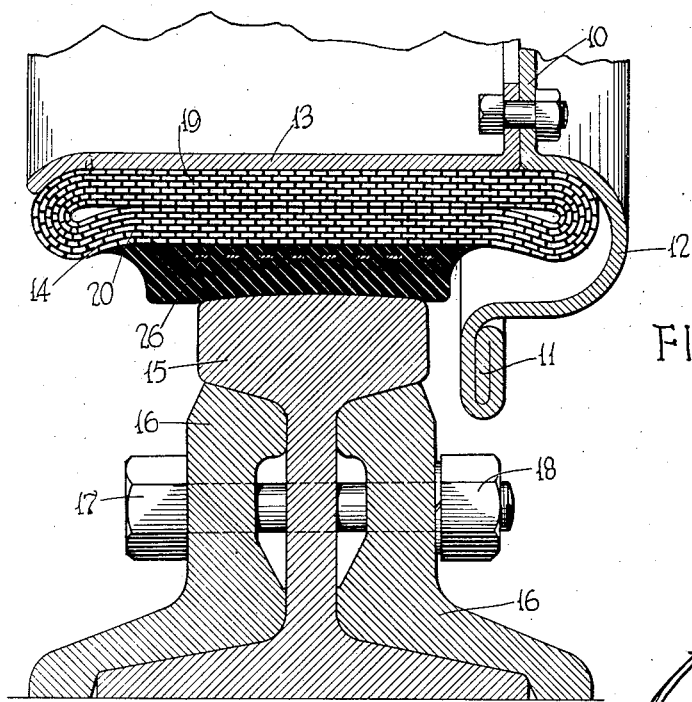
INVENTOR.

Patented July 23, 1935

2,009,349

UNITED STATES PATENT OFFICE 2,009,349

RAILWAY VEHICLE TIRE

John P. Tarbox, Philadelphia, Pa., assignor to Edward G. Budd Manufacturing Company, Philadelphia, Pa., a corporation of Pennsylvania Application June 25, 1932, Serial No. 619,232

3 Claims. (Cl. 295—31)

My invention relates to vehicle tires and more particularly to tires of the type adapted for operation on rail vehicles, wherein serious disadvantages are incurred if tire changes are required because of deflation under every condition of use.

In vehicle tires of the type enumerated it is essential that the body of air internally of the tire be peripherally displaced in the tire during operation so as to maintain the said body of air in action thereby cooling the walls and keeping them in a state of constant temperature. Tires made for the above purposes incorporating limit stops interiorly or upon the interior walls of the same are expensive to construct and it is one of the features of my invention to eliminate this expensive construction.

My invention comprehends a tire having a section substantially oval in shape, the radial inner and outer walls of which are substantially flattened and practically parallel under conditions of operation thereby diverging from a true oval section and having a tread portion of a width substantially less than the gross width of the tire and having means in the said tread portion arranged to maintain the tire cross section substantially as described under all conditions of retained pressure.

Another object of the invention is to have the interior surface walls of the tire per se, act complementally as limit stops.

Another feature of my invention will be found in the fact that when a tire of substantially great transverse section is made wherein the radial spacing of the inner and outer walls is relatively small, flexing of the end or side walls of the tire results in serious fatigue losses resulting in heating and a reduced life of the tire. By eliminating internal obstructions of the surfaces and by constructing the walls of substantially uniform thickness this flexing of the side walls is transmitted into the inner radial wall of the tire, thus avoiding serious localization of the flexing and giving a tire of great life.

I attain the above enumerated desirable objects and others incidental thereto by constructing a tire as previously described with a cross section substantially as shown.

My invention will be better understood from the following explanation when considered in connection with the accompanying drawing.

Figure 1 is a transverse cross section of a tire constructed in accordance with my invention shown in operative relation with a rail head, and Fig. 2 is a similar cross section showing the extreme condition of total tire deflation.

In the figures the wheel comprehends substantially a wheel body 10 having a rail engaging flange 11 and an arcuate section of considerable axial extent 12 with a tire retaining rim 13 and a tire 14. The normal track section is shown as comprising a rail 15 with fish plates 16, and the bolted fastening means 17 and 18. The parts described are with the exception of the tire not a part of the present invention, but are merely incidental to the embodiment of the invention within its primary preconceived application.

The tire comprises an annular member having walls of uniform thickness substantially throughout, being the radially inner and outer walls 19 and 20 respectively, and the end or side walls 21 and 22. These walls define a substantially elongated oval air space 23. The radial dimension of this air space is very small being commensurate with the spacing between the normal obstructions in railway constructions such as the bolts 18 or any other structural elements of a rail system and the lowermost extremity of the wheel flange 24. The flange and these obstructions must always be maintained in a spaced relation so that under all conditions of operation no situation will occur wherein a tendency will develop to throw the flange over the rail or to destroy any of the rail structural elements.

It is vitally important in rail operation that the rail structures be not interfered with. It is likewise vitally important that the vehicle should upon no occasion be thrown from the rails due to riding upon obstructions and also it should not be necessary to change a tire immediately upon deflation but the same should be so constructed as to withstand operating usage under conditions of deflation for a period of time which will not interfere with normal train schedules.

When the tires for this purpose are constructed with interior abutments or limit stops essentially a large radial depth of tire is needed. Without these internal limit stops I construct my tire of very small radial extent. The transverse extending walls 19 and 20 are substantially uniformly spaced throughout their transverse extent commensurate with the dimension previously discussed, so that under conditions of deflation the rail engaging flange will not strike any parts of the track structure. Fig. 2 shows this condition.

The outer wall 20 of the tire has mounted thereon a tread body 25 of rubber of appreciable depth. Mounted interiorly of this body in annular relation are a plurality of members 26 of proper form and material to retain the tire under all conditions of retained pressure with an effective predetermined diameter substantially transverse throughout. The axially extending rib 12 is to receive the tire under conditions of deflation without any pinching between the rail and rim and/or flange and the tire is mounted upon the rim in such a manner that free flexing of the short substantially radially extending walls 21 and 22 does not bear the entire fatigue stresses of flexing, but this flexing is carried into the inner wall 19 and thereby distributed throughout the entire body. The tread portion 25 is likewise of limited width being commensurately large as to the rail head surface but commensurately small as to the total width or gross width of the tire. This air space may have a transverse dimension of as much as nine times its radial dimension and is necessarily manifold the radial dimension.

The tire of my invention as will readily be seen incorporates the previously enumerated advantageous features and is susceptible of modification within its true spirit and scope, which may be determined from the claims appended hereto and made a part hereof.

What I claim is:

1. A rail vehicle tire for a wheel having a flange, comprising walls of uniform thickness defining an elongated oval section air space, of radial dimension transversely throughout such as to preclude engagement of the retaining flange with customary portions of track equipment, having a tread body of transverse width substantially less than the gross tire width, means in said tread body to limit extension to the predeterminately described cross section formation, and the radially inner walls and lateral portions of the outer wall extending beyond said tread body arranged to flex freely with the side walls to preclude localized fatigue.

2. A rail wheel comprising in combination a transversely flat rim base, a rail engaging flange extending radially outwardly from said rim base, a transversely oblong pneumatic tire seated on said rim base and having an outer thickened tread portion of substantially less width than the total width of the tire and adapted to engage the head of a rail, the side and inner walls of the tire being of substantially uniformly thin cross section as compared with the tread portion, and forming with the outer wall a transversely elongated air space free from integral projections and whose length is many times its radial depth, the radial depth being less than the normal running distance between the flange and the nearest usual obstruction at any time vertically below it in its path of movement beside the rail, whereby upon deflation of the tire the flange is prevented from striking such obstructions and the load is supported through the engagement of the outer and inner walls of the tire for the entire width of the rail head.

3. A railway tire having a transverse cross section, the inner and side walls of which are of substantially uniform thickness and the outer wall having a central thickened tread portion and lateral portions of substantially the thickness of the side walls and merging thereinto, the walls of the tire enclosing an air space which, when the tire is inflated upon a rim, is limited in radial depth to a value less than the normal running distance between the periphery of a wheel flange and the nearest usual obstruction at any time vertically below its path of movement beside the rail, the gross width of the tire being sufficiently greater than the tread width to enable the lateral portions of the outer wall beyond the tread portion to partake of flexure in conjunction with the side walls, and an annular winding in the tread portion for determining the radial depth of the air space under inflation pressure.

JOHN P. TARBOX.